United States Patent Office 2,724,008
Patented Nov. 15, 1955

2,724,008

PREPARATION OF ACETYLENIC HYDROCARBONS

Ashton M. Lyon, Summit, and Thomas F. Rutledge, Madison, N. J., assignors to Air Reduction Company, Incorporated, a corporation of New York No Drawing. Application October 11, 1952, Serial No. 314,414

10 Claims. (Cl. 260—678)

This invention relates to the preparation of acetylenic hydrocarbons from alkaline earth carbides, and has for its object the provision of an improved method of preparing mono-substituted acetylenes from alkaline earth carbides. Our invention provides a two-phase operation, in one phase of which an alkaline earth carbide and a strong base such as an alkali hydroxide are heated with an organic solvent, and a second phase in which the cooled product of the first phase is reacted with an organic halide to form the mono-substituted acetylenes.

In carrying out the first phase of our invention, we may use any alkaline earth metal carbide, the preferred carbides being calcium or barium carbide which are most effective when in a finely divided state. As a strong base we prefer to use sodium or potassium hydroxide, potassium hydroxide being preferred because of its relatively low melting point. As an organic solvent for the first phase, we may use ethers, monoethers, polyethers, acetals and ketals. We prefer to use the relatively high boiling point solvents, for example those having a boiling point around 150° C., because the first stage can then be carried out at atmospheric pressure. Moreover, such solvents are relatively easily separated by distillation. While we can use monoethers, such as di-n-hexyl ether and diphenyl-ether, it is advantageous to use polyethers, such for example, as dibutylcarbitol (di-n-butyl ether of diethylene glycol), and dibutyl Cellosolve (di-n-butyl ether of ethylene glycol) because they result in a better yield.

In carrying out the second phase of our invention, the cooled reaction product of the first phase in the form of a slurry, preferably at room temperature, is mixed with an organic halogen compound. Any suitable organic iodide, bromide or chloride may be used, such as n-alkyl chlorides and bromides. However, we may use one or more of a large number of such organic halide compounds with varying degrees of effectiveness. Among these may be included RX, ArX, RCF$_2$X, where X may be Cl, Br or I. R may be primary, secondary, tertiary, or branched chain combinations of alkyl halides. The branching should preferably occur beyond the second carbon atom. For example:

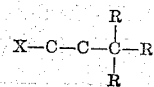

Alkyl halides with such branching are preferred, because they do not undergo side reactions such as dehydrohalogenation. Ar may be phenyl, p-tolyl, benzyl, and other substituted phenyl groups. R and Ar may also contain halogen atoms (e. g. trimethylene-chlorbromide).

In the second phase of the operation, the limiting temperature maximum is the point at which significant decomposition, rearrangement, etc., of either organic reactant or product occurs. Temperatures between 20° and 90° C. are suitable for alkyl bromides. At about 90° C. appreciable dehydrohalogenation occurs. Temperatures below 20° C. may be conveniently employed in some cases, and higher temperatures are useful in other cases, depending upon the reactants and products. There is apparently nothing critical with respect to the time during which the second phase is continued, the period varying from 2 to 20 hours depending largely upon the halide used and the properties of the products. In general, the operation is carried out at atmospheric pressure; however, higher pressures may be used, particularly when low molecular weight (hence low boiling point) reactant and low molecular weight products are produced. The optimum pressure is that which affords easy and convenient handling of the reactants and products.

When the reaction with the halide has run its course, the product can be separated in any suitable way. For example, the product can be filtered and the filtrate subjected to fractionation for the recovery of the acetylenic hydrocarbon. Alternatively, the entire reaction mass may be acidified with dilute mineral acid (e. g. HCl, $CO_2$, etc.), and the organic layer freed of acid and fractionated.

In carrying out a complete and preferred operation of the invention, calcium carbide, advantageously in a fine state of subdivision, and flaked, pelleted or pulverized potassium hydroxide and a high boiling point organic solvent, for example, dibutylcarbitol, are slurried at a temperature of from 125° to 250° C. for around 18 hours at atmospheric pressure, and then the mixture is cooled, say, to 50° C. In this phase of the process considerable flexibility in the operating conditions is possible. Generally, temperatures of from 140° C. to 250° C. during a period of from 1 to 24 hours may be employed.

The slurried product of the first phase of the operation is stirred while the organic halide is incorporated therein. The stirring is continued for a sufficient period to complete the reaction, say, around 40 hours while keeping the temperature around 50° C. The mixture is then acidified as with dilute hydrochloric acid and the resulting organic layer is separated, neutralized with a suitable base and fractionated. The mono-substituted acetylene, which is recovered following fractionation, is an amount corresponding to around 35 to 40 mol per cent of the organic halide consumed. The substituted acetylene may be isolated in one of several ways, as follows:

(a) Filtration of the reaction mixture followed by saturation of the organic liquid filtrate with carbon dioxide to destroy free hydroxides.

(b) Hydrolysis of the reaction mixture with dilute mineral acid, such as hydrochloric acid, dissolves the solids and results in an organic layer and an acid aqueous layer containing dissolved salts. The organic layer is removed, and treated with solid anhydrous sodium or potassium carbonate. This neutralizes residual acids and removes water, rendering subsequent fractionation less troublesome.

(c) The reaction mixture can be hydrolyzed with sufficient water to result in an easily filterable mixture, from which the organic layer is removed. Saturation of the filtrate with carbon dioxide destroys excess free base.

(d) After neutralization and desiccation by any of the above procedures, the reaction mixture is fractionally distilled to separate the mono-substituted acetylene, unreacted halide, and diluent. Since the diluents are high-boiling liquids, they are distilled under reduced pressure.

The following examples are illustrative of operations carried out in accordance with the invention:

Example I

*Phase I.*—One mol (dry basis) potassium hydroxide pellets and 0.825 mol powdered calcium carbide were slurried in 400 ml. of dibutyl carbitol at 150±5° C. for 18 hours. The mixture was cooled to 50° C.

*Phase II.*—Two mols of n-butyl bromide were stirred with the slurry of phase I for 44 hours at 50±5° C. The mixture was acidified with cold dilute HCl, and the organic layer neutralized with potassium carbonate, dried, filtered, and fractionated. The organic layer was topped to about 100° C. at 2 mm. mercury pressure. The distillate was then fractionated through a packed column. Product 1-hexyne was obtained at 69–71° C. Unreacted n-butyl bromide was recovered at 99–101° C. in amount corresponding to about 60 per cent of the original charge of n-butyl bromide. The cut intermediate between 71 and 99° C. was small, and was found by analysis to contain a small additional quantity of 1-hexyne.

The dibutylcarbitol residue from the vacuum topping operation above was distilled at about 100°–105° C. at 2 mm. pressure. Recovery of solvent was excellent, about 10–20 per cent being lost in the various manipulations involved in the experiment.

*Yield.*—20.3 mol per cent on carbide, 37 mol per cent on halide consumed.

Example II

*Phase I.*—Using the same reactants as in phase I of Example I, the slurry was heated at from 145° to 165° C. for 2 hours and maintained at 110° C. overnight.

*Phase II.*—Two mols of n-butyl bromide were reacted with the mixture for 28 hours at 40° C. The product was isolated by filtration, and fractionation of the filtrate. A fraction was obtained boiling at 69–72° C. containing 1-hexyne corresponding to 17.3 mol per cent conversion of carbide and 36 mol per cent based on halide consumed.

Example III

Two experiments were conducted in substantially the same manner as illustrated in Examples I and II. In one case a "mixed" organic halide, 1-bromo-3-chloropropane was used. As expected, a reasonable yield of 5-chlor-1-pentyne was obtained. Apparently reaction at the bromo substituent was preferential.

In the second phase, n-amyl chloride was used as organic halide. The n-amyl chloride produced a yield of about 5 mol per cent of 1-heptyne, based on n-amyl chloride consumed.

Example IV

*Phase I.*—One mol potassium hydroxide (dry basis) and 0.75 mol of calcium carbide (Keokuk rice, pulverized, 76% assay) were slurried in 500 ml. of dibutylcarbitol at 150° C. for 18½ hours. The mixture was cooled to 0° C.

*Phase II.*—One mol of methyl bromide was reacted with the above mixture at 0° to 40° C. and 1-propyne was isolated in an amount corresponding to 17 mol per cent conversion of calcium carbide.

We claim:

1. The method of preparing mono-substituted acetylenes from alkaline earth carbides which comprises forming a slurry of an alkaline earth carbide, an alkali metal hydroxide, and an organic solvent which is inert with respect to said reactants, heating the slurry to a temperature sufficiently high to result in substantial completion of the reaction, cooling the slurry, mixing therewith an organic halide of the group consisting of a chloride, bromide, and iodide, and separating from the reacting materials the mono-substituted acetylene.

2. The method of preparing mono-substituted acetylenes from alkaline earth carbides which comprises forming a slurry of an alkaline earth carbide, an alkali metal hydroxide, and an organic solvent which is inert with respect to said reactants, heating the slurry to a temperature sufficiently high to result in substantial completion of the reaction, cooling the slurry to a temperature less than the temperature at which significant decomposition or rearrangement of the organic halide added subsequently or of any finally resulting organic product, mixing therewith an organic halide of the group consisting of a chloride, bromide, and iodide, and separating from the reacting materials the mono-substituted acetylene.

3. A method of preparing mono-substituted acetylenes from alkaline earth carbides in accordance with claim 1, in which the slurry is heated to a temperature in the range of from 125° C. to 250° C., and the slurry is cooled to a temperature in the range of from 0° to 90° C.

4. A method of preparing mono-substituted acetylenes from alkaline earth carbides in accordance with claim 1, in which the alkaline earth carbide comprises finely divided calcium carbide, and the alkali metal hydroxide is one of the group consisting of sodium hydroxide and potassium hydroxide.

5. The method of preparing mono-substituted acetylenes from alkaline earth carbides which comprises forming a slurry of an alkaline earth carbide, an alkali metal hydroxide of the group consisting of sodium and potassium hydroxide, and an organic solvent, heating the slurry to a temperature in the range of from 125° to 250° C. until the reaction has been substantially completed, cooling the slurry to around room temperature and mixing therewith an organic halide of the group consisting of chlorine, bromine and iodine, and separating from the reacting materials the mono-substituted acetylene.

6. In the method of claim 5, acidifying the product after the reaction with the organic halide, separating an aqueous layer from the organic layer, neutralizing the organic layer, and recovering the mono-substituted acetylene from the organic layer by fractionation.

7. The method of preparing mono-substituted acetylenes from alkaline earth carbides which comprises reacting an alkaline earth metal carbide and an alkali metal hydroxide of the group consisting of sodium hydroxide and potassium hydroxide in the presence of an organic solvent and at a temperature of from 125° C. to 250° C., cooling the reaction product to around room temperature, mixing with said reaction product an organic halide of the group consisting of chlorine, bromine and iodine, and after the completion of the reaction resulting in the formation of acetylene separating the mono-substituted acetylene.

8. In the method of claim 7, separating the mono-substituted acetylene by filtering the last reaction product, adding carbon dioxide to the filtrate to neutralize the free hydroxides, and separating the mono-substituted acetylene by fractionation.

9. In the method of claim 7, neutralizing the solution after formation of the mono-substituted acetylene, removing water therefrom, and separating the mono-substituted acetylene by fractionation.

10. In the method of claim 7, adding a dilute acid to the solution after the formation of the mono-substituted acetylene, separating an organic layer, neutralizing the organic layer with a basic material, and recovering the mono-substituted acetylene by fractionation.

References Cited in the file of this patent

UNITED STATES PATENTS

| | | |
|---|---|---|
| 2,198,236 | Vaughn | Apr. 23, 1940 |
| 2,542,976 | Airs et al. | Feb. 27, 1951 |

OTHER REFERENCES

Mellor: "Comprehensive Treatise on Inorganic and Theoretical Chemistry," vol. 5, page 848, lines 53–55, published 1924, Longmans, Green and Co., N. Y.